April 20, 1954 A. H. WULFSBERG ET AL 2,676,289

SHAFT POSITIONING MECHANISM FOR BINARY CODE OPERATION

Filed Nov. 2, 1951 2 Sheets-Sheet 1

INVENTOR.
HORST M. SCHWEIGHOFER
ARTHUR H. WULFSBERG
BY
Marvin Moody
ATTORNEY

INVENTOR.
HORST M. SCHWEIGHOFER
ARTHUR H. WULFSBERG
BY
ATTORNEY

Patented Apr. 20, 1954

2,676,289

UNITED STATES PATENT OFFICE 2,676,289

SHAFT POSITIONING MECHANISM FOR BINARY CODE OPERATION

Arthur H. Wulfsberg and Horst M. Schweighofer, Cedar Rapids, Iowa, assignors to Collins Radio Company, Cedar Rapids, Iowa, a corporation of Iowa Application November 2, 1951, Serial No. 254,514

8 Claims. (Cl. 318—8)

This invention relates in general to shaft positioning mechanisms and in particular to a shaft positioning device which operates on a binary code.

Sometimes it is desirable to convert a binary electrical signal to a mechanical shaft position. The electrical signal may be coded into an arbitrary combination of pulses such as is used in Morse or Teletype code, or alternately, it may be based on a binary number system wherein successive pulses (or different frequencies) have values of 1, 2, 4, 8 . . . . $2^n$ with the numerical value transmitted being the sum of those pulses present in the transmission. The apparatus of this invention is designed to be operated from such electrical signals and convert them to a shaft position. The shaft to be controlled might, for example, be the main tuning shaft of a transmitter so that it may be tuned in response to the received signal.

It is an object of this invention therefor, to provide a converting mechanism which changes electrical signals from a binary code to a shaft position.

Figure 1:
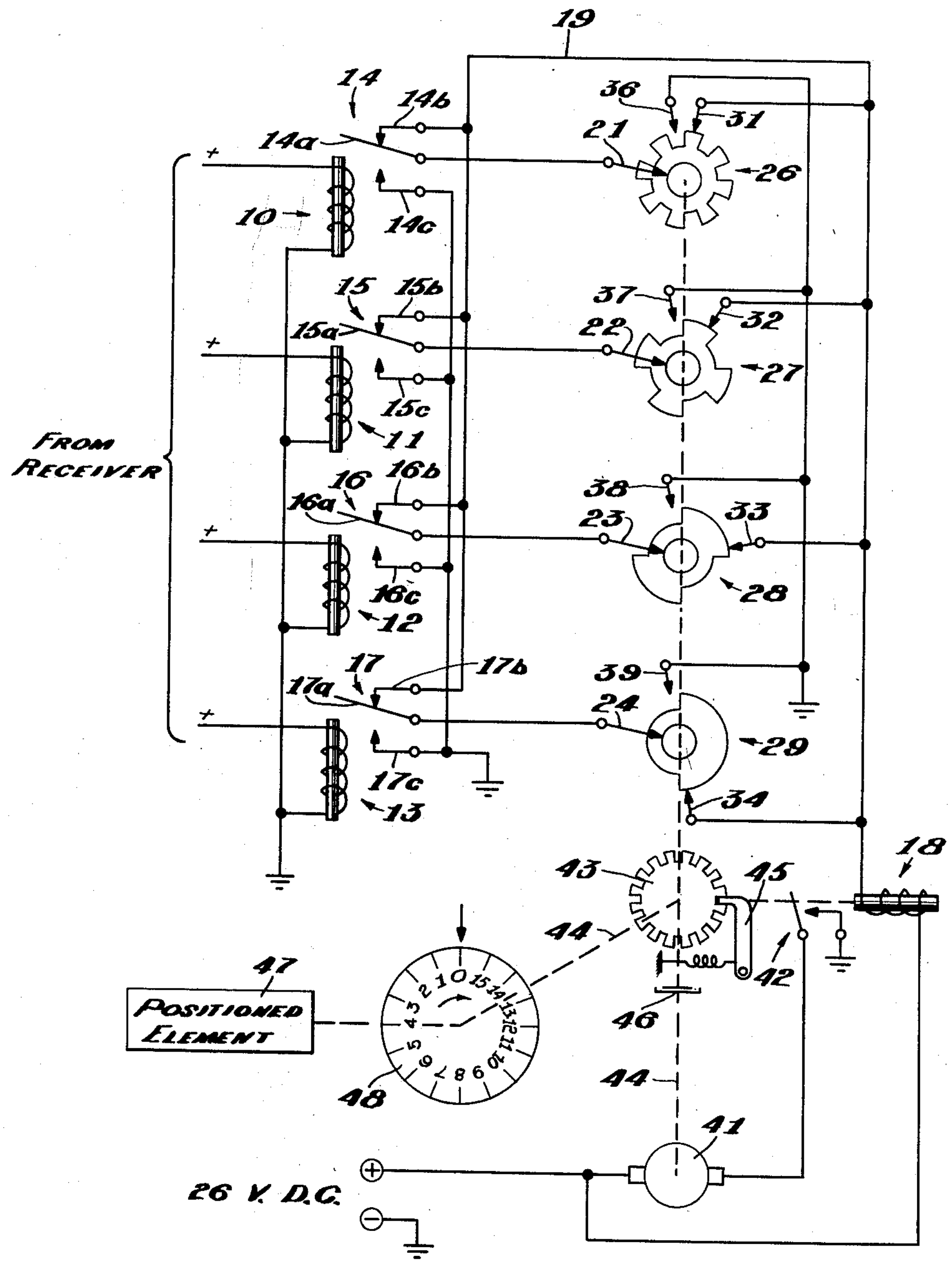
Figure 2:
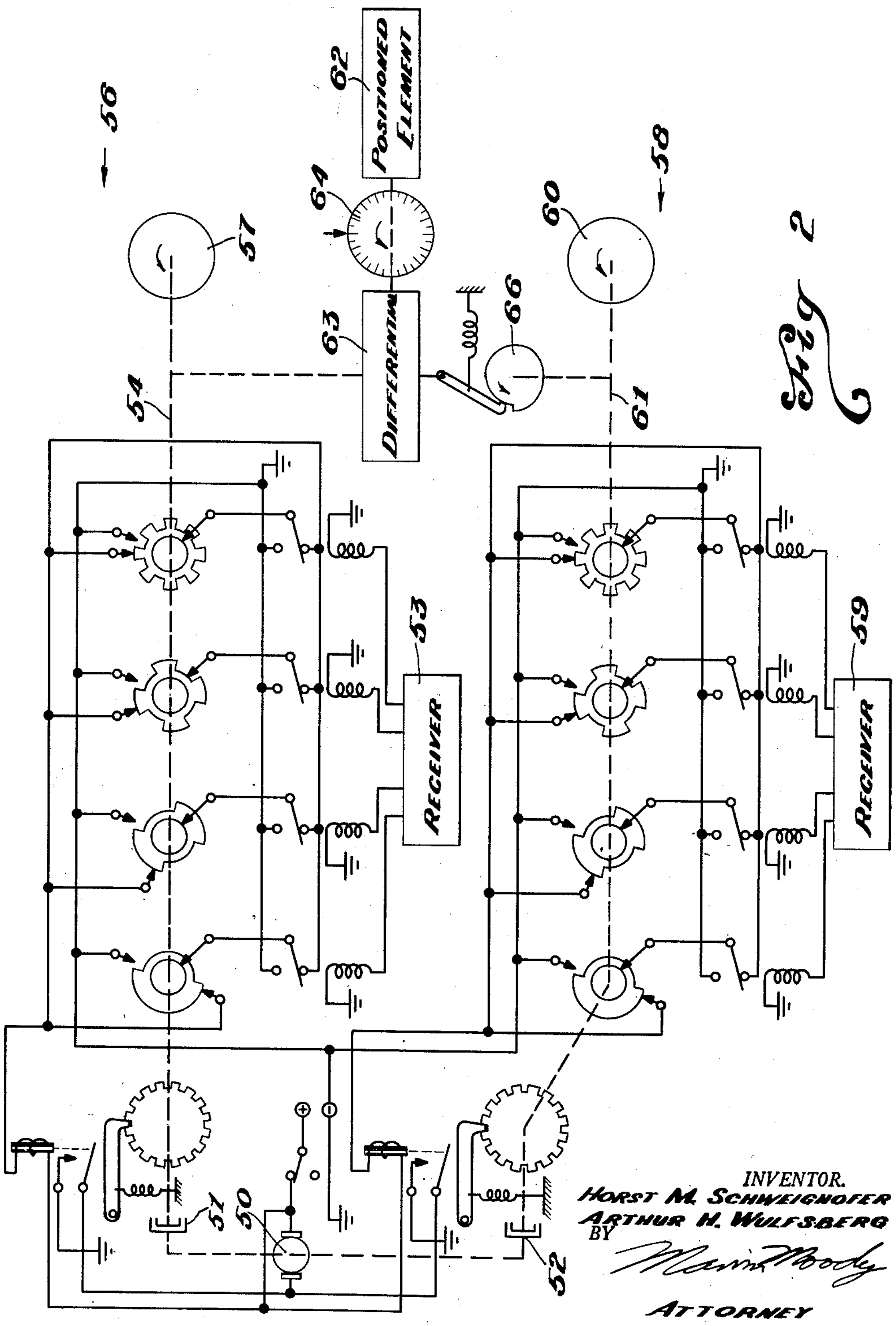

Further objects, advantages and features of this invention will become apparent from the following description and claims when read in view of the drawings in which:

Figure 1 is a schematic illustration of a system having 16 different shaft positions; and Figure 2 is a schematic illustration of apparatus according to this invention which has 256 different shaft positions.

In Figure 1 a number of relays as, for example, four are designated 10 through 13. The relay coils have one side grounded and the other side connected to a suitable receiver which energizes each relay in response to the electrical code being transmitted. For example, the first relay 10 might correspond to the 0 or 1 digit, and the electrical impulses received by the relay 10 will indicate which of these two numbers is being transmitted. The second relay 11 might correspond to the 0 or 2. Likewise, relay 12 might indicate the values of 0 or 4, and relay 14 the values of 0 or 8.

The relays 10 through 13 control the position of two-way switches 14 through 17. The contact arms 14-*a*—17-*a* of the switches remain past center once they are moved until they are moved to the opposite position by the relays. The relays are polarized and may move the contact arms either way. First contacts 14-*b* through 17-*b* of the switches are connected together and to a motor control relay 18 by lead 19. The other side of relay 18 is connected to the positive side of a D. C. voltage.

The second contacts 14-*c* through 17-*c* of the switches are connected together and to ground.

The two-way contact arms 14-*a* through 17-*a* are electrically connected to contacts 21, 22, 23 and 24 which engage wafer switches 26, 27, 28 and 29. The wafer switches 26 through 29 are formed with varying numbers of projections.

Wafer switch 29 has a projection which covers one-half of the switch. Switch 28 is divided into four portions with two projections and switch 27 has four projections. Switch 26 has eight projections.

The contacts 21 through 24 always engage the switches 26 through 29. The conductor 19 is connected to a wiper contact for each of the switches 26 through 29. The wiper contacts are designated as 31 through 34 and engage only the projections of the switches 26 through 29. They are open circuited when a low portion of the switches are opposite them.

A second group of wiper contacts 36 through 39 are mounted adjacent the switches 26 through 29 and are connected together and to ground. The pair of wiper contacts for each switch are mounted apart a distance equal to the distance between centers of adjacent high and low segments of the switches.

A driving means 41 as, for example, an electrical motor is connected to the positive side of the D. C. supply and its opposite side is connected to a two-way switch 42 which is actuated by relay 18 so when the relay is energized the motor circuit is closed.

A toothed stop wheel 43 is mounted on shaft 44 and drives the wafer switches 26 through 29. It is connected to the motor 41 through a suitable clutch 46. A pawl 45 engages the stop wheel 43 and is controlled by relay 18. A positioned element 47 is also mounted on the shaft 44 and an indicator disc 48 indicates which position is being utilized. The drive means and toothed stop wheel combination is similar to the one described in Patent Number 2,476,673 and reference may be made thereto for a more complete description.

In operation, a received signal is changed to a binary code to actuate the relays 10 through 13. Suppose, for example, that it is desired to transmit the shaft position 9. This would require that the relays 10 and 13 be energized so that the switch arms 14-*a* and 17-*a* would move downwardly. When this occurs the relay 18 will be energized thus closing the motor circuit and lifting the locking pawl 45 from the stop wheel 43. The motor then rotates the seeking switches 26 through 29 until an open circuit occurs in the control circuit. This occurs when contacts 32 and 33 engage high positions of their respective switches and simultaneously the contacts 31 and 34 are in their open circuit positions. When the open circuit is found the pawl 45 falls into a notch in the stop wheel. The positioned element 47 and the indicator 48 are in position number 9. For each combination of settings of switches 14 through 17 there is a corresponding shaft position.

It is seen that the apparatus of Figure 1 allows any one of 16 positions to be transmitted. If a larger number of shaft positions are desired, a larger number of switches are required. However, with the system shown in Figure 1 as the number of switches is increased the smallest unit wafer switch must be divided to have a larger number of segments. For example, if five binary digits are utilized, the switch 26 would have to have 16 projections instead of 8.

The apparatus shown in Figure 2 allows 256 different shaft positions to be obtained by combining two systems according to claim. The total number of positions then becomes equal to the product of the possible positions of the combined systems. If two four switch systems are combined, 16 times 16 or 256 positions are available.

As shown in Figure 2 each of the systems have wafer switches, control switches, toothed stop wheels and motor control relays. A single motor 50, however, drives both systems through the clutches 51 and 52. A first receiver 53 controls the position of output shaft 54 which is connected to the upper system, designated generally as 56. The shaft 54 is connected to an indicator 57 and moves in jumps of 16.

The second system is designated generally as 58 and receives control signals from receiver 59. The output shaft 61 of system 58 drives indicator 60. The shaft 61 moves in jumps of one.

The shaft positions of shafts 54 and 61 are added together to control the positioned element 62. This is accomplished by the differential 63 which adds the shaft inputs. An indicator 64 gives the sum of the input shaft positions.

An overrun device 66 comprising a cam and follower is connected between shaft 61 and differential 63 so that the system 58 never adds more than 16 units to the output. This prevents the indicator 64 from indicating a wrong position.

The cam and follower serve two functions:

(1) *Speed reduction.*—Since system 56 moves in jumps of 16 units per 22.5 degrees while system 58 moves in jumps of 1 unit per 22.5 degrees, the relative values of rotation in "units per degree" must be made equal before addition in the differential.

Thus, the cam follower is made to have an angular travel of $\frac{1}{16}$ the travel of the cam 66, or 1 unit per 22.5/16 degrees equals 16 units per 22.5 degrees, the same as shaft 54.

(2) *Non-cumulative rotation.*—When shaft 61 makes one complete revolution, dial 60 returns to the same value. However, if shaft 61 (after suitable gear reduction) is fed directly into the differential, one revolution of the shaft would advance dial 64 by 16 units, accumulating an error of 16 units each time shaft 61 passed from "5" to "0." The cam 66 prevents this.

Although this invention has been described with respect to particular embodiments, it is not to be so limited as changes and modifications may be made therein which are within the full intended scope of the invention as defined by the appended claims.

We claim:

1. Shaft positioning apparatus for controlling the position of a shaft comprising a plurality of relays, a first plurality of contact arms controllable by said relays and movable between first and second contacts, the second contacts connected electrically together and to ground, the first contacts connected electrically together, a motor control relay connected electrically to the first contacts, the opposite side of said motor control relay connected to a power supply, a driving means connected to the power supply, a motor switch actuated by said motor control relay and connected between the driving means and ground, a toothed stop-wheel mounted on the output shaft of said driving means, a pivoted pawl engageable with said toothed stop-wheel and connected to said motor relay, a plurality of wafer switches connected to the output shaft of said driving means, a first one of said wafer switches formed with eight projections spaced equidistance about the periphery, a second of said wafer switches formed with four projections spaced equidistance about the periphery, a third one of said wafer switches formed with two projections formed equidistance about the periphery, a fourth wafer switch formed with one projection, a second plurality of contact arms connected respectively to the first plurality of contact arms and engageable with the wafer switches at all times, a first group of wiper contacts mounted about the peripheries of said wafer switches and engageable with the projections, said first plurality of wiper contacts electrically connected together and to the motor control relay, a second plurality of wiper contacts mounted adjacent the wafer switches and engageable with the projections of the wafer switches, and said second plurality of wiper contacts connected together electtrically and offset along the periphery from the first wiper contacts by one projection width.

2. Shaft control mechanism for positioning a controlled element to a number of distinct positions comprising, a driving means, a toothed stop wheel connected to the output shaft of said driving means, the controlled element mounted on the output shaft of said driving means, a pawl engageable with the teeth of said toothed stop wheel, a motor control switch connected to said driving means, a motor control relay connected to actuate said pawl and said motor control switch, a plurality of wafer switches connected to the output shaft of the driving means and formed with a varying number of projections, a first plurality of wiper contacts connected electrically to the motor control relay and engageable with the projections of said wafer switches, a second plurality of wiper contacts connected to ground and engageable with the projections of said wafer switches, said second plurality of wiper contacts offset along the periphery from the first wiper contacts so that when a first wiper contact engages a projection the corresponding second one is disengaged, a first plurality of contacts connected together and to the motor control relay, a second plurality of contacts connected together and to ground, a plurality of contact arms movable between the first and second plurality of contacts, a third plurality of wiper contacts engageable at all times with the wafer switches and connected respectively to the plurality of contact arms, and a plurality of control relays mounted adjacent said contact arms to control their position in response to control information.

3. A shaft positioning control system comprising, a driving means connected to the controlled shaft, a toothed stop wheel mounted on the output shaft of said driving means, a pivotally supported pawl engageable with the toothed stop wheel, a motor control relay mechanically connected to said pawl to control its position, a motor control switch actuated by said motor control relay, one side of said motor control relay connected to the positive side of a voltage supply, a plurality of wafer switches connected to the output shaft of the driving means, said plurality of wafer switches formed with varying numbers of projections, a first plurality of wiper contacts mounted adjacent the wafer switches and engageable with the projections, said first plurality of wiper contacts connected electrically together and to the opposite side of the motor control relay, a second plurality of wiper contacts engageable with the projections of the wafer switches and connected electrically together and to ground, a plurality of switches having first and second contacts, the first contacts connected together and to the one side of the motor control relay, the second contacts connected together and to ground, contact arms of said control switches movable between the first and second contacts, a plurality of third wiper contacts always engageable with the wafer switches and connected respectively to the contact arms, and a plurality of control relays mounted adjacent the control switches to control the positions of the contact arms.

4. An apparatus for obtaining a plurality of shaft positions equal to the product of the positions available with the combined individual systems comprising a plurality of shaft positioning control apparatuses according to claim 3, a differential receiving the output shaft positions of said plurality of control apparatuses and adding them to obtain the combined position.

5. An apparatus for obtaining a plurality of shaft positions comprising, a first control system according to claim 3 which corresponds to the lower incremental steps for the controlled shaft, a second control system according to claim 3 which corresponds to the larger incremental control steps, a single turn overrun device connected to the output of the first control system, and a differential receiving shaft inputs from the second shaft control system and the overrun device to add them to obtain a number of positions equal to the product of the positions available with the individual first and second control systems.

6. Means for controlling the angular position of an output shaft comprising, a driving means connected to the output shaft, a toothed stop-wheel mounted on the output shaft, a pawl pivotally supported adjacent the toothed stop-wheel and engageable therewith, a plurality of wafer switches each formed with a different number of projections mounted on the output shaft, a motor control relay mechanically connected to said pawl, a motor control switch controlled by the motor control relay, a first plurality of wiper contacts connected to said motor control relay and engageable with the projections of the wafer switches, a second plurality of wiper contacts connected together and to ground and engageable with the projections of said wafer switches, said first and second wiper contacts offset about the peripheries so that they alternately engage the projections, a third plurality of wiper contacts engageable with the wafer switches at all times, a plurality of control switches with their contact arms connected respectively to the third wiper contacts, a first plurality of contacts of said control switches connected electrically together and to the motor control relay, a second plurality of second contacts of said control switches connected electrically together and to ground and an actuating relay mounted adjacent each control switch to control its position in response to control signals.

7. An apparatus for controlling the position of a shaft comprising a pair of shaft position control systems according to claim 4, the output shaft position of the first control system added to the output shaft position of the second control system by means including a differential and an overrun device, connected between the output shaft of the second control system and the differential.

8. Shaft positioning mechanism comprising, a pair of wafer switches, the first of said wafer switches formed with a plurality of projections spaced about its outer periphery, the second wafer switch formed with a different number of projections spaced about its periphery, a first pair of wiper contacts engageable respectively with the projections of the first and second wafer switches, a second pair of wiper contacts engageable respectively with the projections of the wafer switches but offset along the periphery from the first pair of wiper contacts, a third pair of wiper contacts engageable at all times with the wafer switches, a pair of control switches having contact arms movable between a pair of contacts, the contact arms connected, respectively, to the third pair of wiper contacts, the first contacts connected together and to the first pair of wiper contacts, the second contacts connected together and to ground, a motor control relay with one side of its control circuit connected to the first pair of wiper contacts and the other side connected to a power supply, a driving means connected to one side of the power supply, the motor control switch connected between ground and the other side of the driving means, a toothed stop-wheel mounted on the output shaft which is attached to the driving means, a pawl pivotally supported to engage the toothed stop-wheel, said pawl controllable by the motor control relay, and the pair of switches driven by the driving means through the output shaft.

References Cited in the file of this patent

UNITED STATES PATENTS

| Number | Name | Date |
|---|---|---|
| 2,476,673 | May et al. | July 19, 1949 |
| 2,565,334 | Weingarden | June 9, 1949 |